(12) United States Patent
Umayahara (10) Patent No.: US 8,658,324 B2
(45) Date of Patent: Feb. 25, 2014

(54) FUEL CELL SYSTEM

(75) Inventor: Kenji Umayahara, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 329 days.

(21) Appl. No.: 13/259,811

(22) PCT Filed: Jul. 29, 2009

(86) PCT No.: PCT/JP2009/063489
§ 371 (c)(1),
(2), (4) Date: Sep. 23, 2011

(87) PCT Pub. No.: WO2011/013212
PCT Pub. Date: Feb. 3, 2011

(65) Prior Publication Data
US 2012/0020128 A1 Jan. 26, 2012

(51) Int. Cl.
*H01M 8/04* (2006.01)
*H02M 5/42* (2006.01)
*H02M 7/68* (2006.01)
*H02M 3/24* (2006.01)
*H02M 7/44* (2006.01)

(52) U.S. Cl.
USPC .............................. 429/431; 429/442; 363/95

(58) Field of Classification Search
USPC .............................. 363/95; 429/430–433, 442
See application file for complete search history.

(56) References Cited

U.S. PATENT DOCUMENTS

| | | | | |
|---|---|---|---|---|
| 7,867,664 B2* | 1/2011 | Saito et al. | ..................... | 429/430 |
| 7,939,213 B2* | 5/2011 | Ishikawa et al. | .............. | 429/432 |
| 8,153,315 B2* | 4/2012 | Imai et al. | ..................... | 429/430 |
| 8,268,501 B2* | 9/2012 | Tejima | ........................... | 429/431 |
| 2004/0214054 A1* | 10/2004 | Shige et al. | ..................... | 429/13 |
| 2005/0197751 A1* | 9/2005 | Koike | ............................. | 701/22 |
| 2011/0111317 A1* | 5/2011 | Umayahara et al. | .......... | 429/431 |

FOREIGN PATENT DOCUMENTS

| | | |
|---|---|---|
| JP | 08-317659 A | 11/1996 |
| JP | 2005-051898 A | 2/2005 |
| JP | 2007-318938 A | 12/2007 |
| WO | 2009/081835 | 7/2009 |

OTHER PUBLICATIONS

International Search Report mailed Sep. 8, 2009 of PCT/JP2009/063489.

* cited by examiner

*Primary Examiner* — Jue Zhang
(74) *Attorney, Agent, or Firm* — Kenyon & Kenyon LLP (57) ABSTRACT

A fuel cell system FCS includes a fuel cell FC, a motor ES4 connected to the fuel cell FC, an FC boost converter ES6 which raises the output voltage of the fuel cell FC to output the voltage to the motor ES4, an inverter ES3, a current sensor S2, and a controller EC which controls the fuel cell FC, the FC boost converter ES6 and the inverter ES3. The controller EC controls the inverter ES3 so as to raise the target output voltage of the inverter, when the current detected by the current sensor S2 exceeds a predetermined current threshold value.

2 Claims, 6 Drawing Sheets

FUEL CELL SYSTEM

TECHNICAL FIELD

The present invention relates to a fuel cell system comprising a fuel cell and a load connected to the fuel cell.

BACKGROUND ART

As a fuel cell system comprising a fuel cell and a load connected to the fuel cell, a system described in Patent Document 1 is known. In the system, the output voltage of the fuel cell is raised by a first DC/DC converter and output to the load. Moreover, when the only output of the fuel cell is supplied, a power necessary for the load runs short. In this case, a power to compensate for the shortage is output from an accumulator to the load via a second DC/DC converter. When the output power of the fuel cell exceeds the power of the load, the power is supplied from the fuel cell to the accumulator through the first and second DC/DC converters to charge the accumulator.

In a control device of the fuel cell system described Patent Document 1, the target power of a motor as the load is calculated. The control device calculates the target voltage of the motor in accordance with the target power thereof, to calculate the target output current of the fuel cell. The control device feedback-controls the target output current as the target current of the first DC/DC converter, and feedback-controls the target voltage of the motor as the target voltage of the second DC/DC converter.

PRIOR ART DOCUMENT

Patent Document

[Patent Document 1] Japanese Patent Application Laid-Open No. 2007-318938

SUMMARY OF THE INVENTION

Problem to be Solved by the Invention

A technology described in Patent Document 1 calculates a target voltage and a target current in accordance with a target power to perform feedback control. It is also assumed that a large current flows between a first DC/DC converter as a boost converter and a second DC/DC converter or an inverter. In such a fuel cell system, the second DC/DC converter, the inverter and the like constitute a power control unit (PCU). The first DC/DC converter is connected to the PCU via a power cable sometimes. In this case, a large current exceeding the allowable current of a power line (the power cable) might flow.

The present invention has been developed in view of such a problem, and an object thereof is to provide a fuel cell system having a constitution in which a current exceeding the allowable current of a power line extending from a fuel cell to an inverter does not flow.

Means for Solving the Problem

A fuel cell system according to the present invention for achieving the above object is a fuel cell system comprising a fuel cell and a load connected to the fuel cell. This fuel cell system comprises a converter which is interposed between the fuel cell and the load and which raises the output voltage of the fuel cell to output the voltage to the load; an inverter which converts a direct-current power output from the converter into an alternate-current power to output the power to the load; a controller which controls the fuel cell, the converter and the inverter; and a current sensor which detects a current flowing between the converter and the inverter. The controller controls the inverter so as to raise the target output voltage of the inverter, when the current detected by the current sensor exceeds a predetermined current threshold value.

According to the present invention, since the current sensor for detecting the current flowing between the converter and the inverter is disposed, it is possible to detect the current flowing to the inverter from the converter which raises the output voltage of the fuel cell. The current flowing through a power line extending from the fuel cell to the inverter can be detected. The controller controls the inverter so as to raise the target output voltage of the inverter, when the current detected by the current sensor exceeds the predetermined current threshold value. Even when an excessively large current is likely to flow through the power line extending from the fuel cell to the inverter, the target output voltage of the inverter can be raised to suppress the current thereof.

To achieve the above object, the fuel cell system according to the present invention is a fuel cell system comprising a fuel cell and a load connected to the fuel cell. This fuel cell system comprises a converter which is interposed between the fuel cell and the load and which raises the output voltage of the fuel cell to output the voltage to the load; an inverter which converts a direct-current power output from the converter into an alternate-current power to output the power to the load; a controller which controls the fuel cell, the converter and the inverter; and a temperature sensor which detects the temperature of a power line between the converter and the inverter. The controller controls the inverter so as to raise the target output voltage of the inverter, when the temperature detected by the temperature sensor exceeds a predetermined temperature threshold value.

According to the present invention, since the temperature sensor for detecting the temperature of the power line between the converter and the inverter is disposed, it is possible to detect the temperature between the inverter and the converter which raises the output voltage of the fuel cell. The actual temperature of the power line extending from the fuel cell to the inverter can be detected. The controller controls the inverter so as to raise the target output voltage of the inverter, when the temperature detected by the temperature sensor exceeds the predetermined temperature threshold value. For example, when an environmental temperature is low and the allowable current of the power line is high, such an operation as to keep the target output voltage of the inverter can be performed. On the other hand, when an excessively large current flows through the power line extending from the fuel cell to the inverter to raise the temperature of the power line, the target output voltage of the inverter can be raised to suppress the current thereof. An operation which gives priority to efficiency can be performed in accordance with the state of the power line.

Effect of the Invention

According to the present invention, there can be provided a fuel cell system having a constitution in which a current exceeding the allowable current of a power line extending from a fuel cell to an inverter does not flow.

BEST MODE FOR CARRYING OUT THE INVENTION

Hereinafter, an embodiment of the present invention will be described with reference to the accompanying drawings. To facilitate the understanding of the description, the same constituent elements in the drawings are denoted with the same reference numerals wherever possible, whereby redundant description is omitted.

Figure 1:
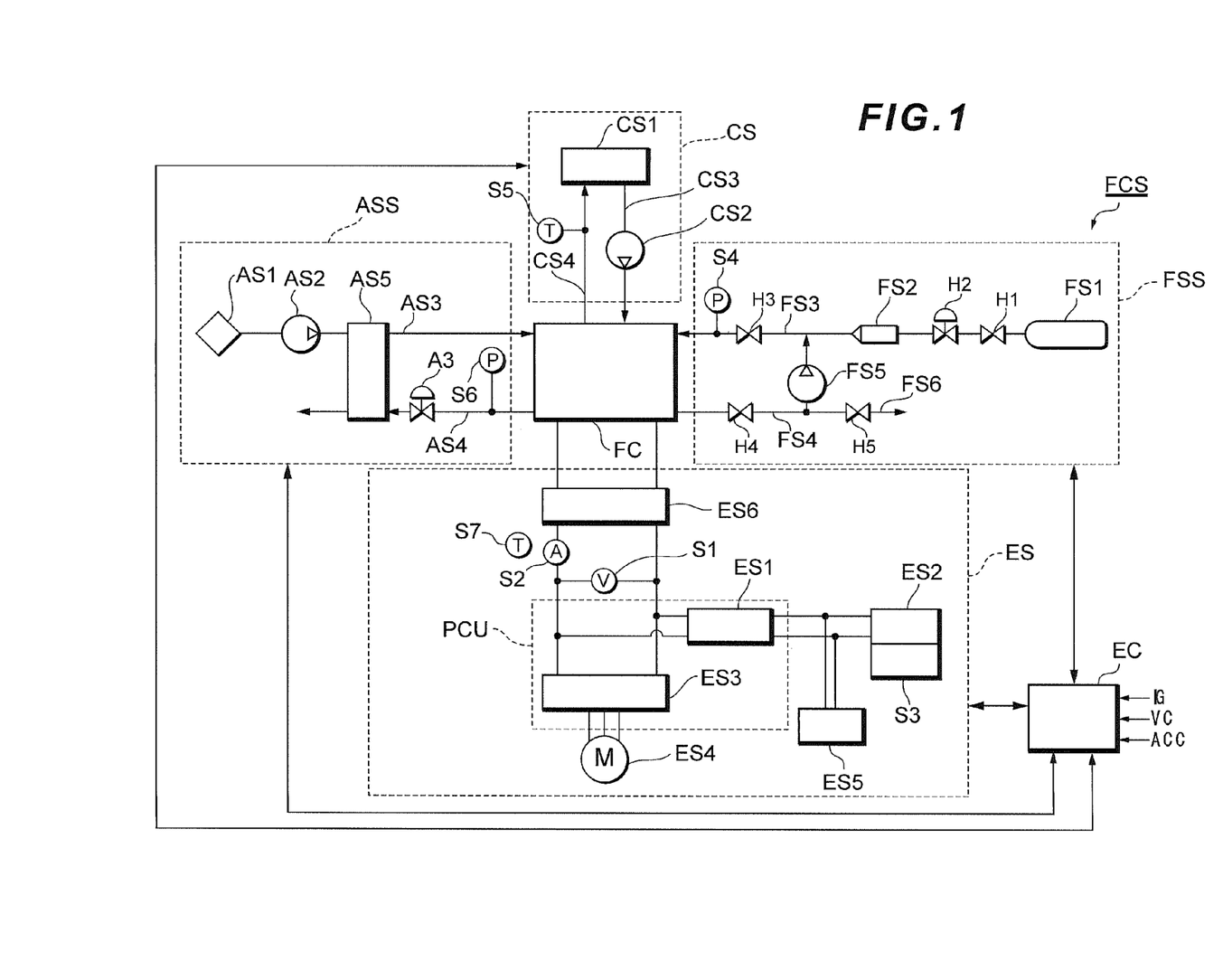
FIG. 1 is a diagram showing a constitution of a fuel cell system according to an embodiment of the present invention.

First, a fuel cell system FCS mounted in a fuel cell vehicle according to the embodiment of the present invention will be described with reference to FIG. 1. FIG. 1 is a diagram showing a system constitution of the fuel cell system FCS which functions as a car-mounted power source system of the fuel cell vehicle. The fuel cell system FCS can be mounted in a vehicle such as a fuel cell hybrid vehicle (FCHV), an electric car or a hybrid car.

The fuel cell system FCS comprises a fuel cell FC, an oxidizing gas supply system ASS, a fuel gas supply system FSS, a power system ES, a cooling system CS and a controller EC. The fuel cell FC receives supply of a reactant gas (a fuel gas and an oxidizing gas) to generate a power. The oxidizing gas supply system ASS is a system for supplying air as the oxidizing gas to the fuel cell FC. The fuel gas supply system FSS is a system for supplying a hydrogen gas as the fuel gas to the fuel cell FC. The power system ES is a system for controlling the charging/discharging of the power. The cooling system CS is a system for cooling the fuel cell FC. The controller EC (a control unit) is a controller which generally controls the whole fuel cell system FCS.

The fuel cell FC has a constitution of a solid polymer electrolyte type cell stack in which a large number of cells (unitary cells (power generators) each comprising an anode, a cathode and an electrolyte) are stacked in series. In the fuel cell FC, an oxidizing reaction of formula (1) occurs in the anode and a reducing reaction of formula (2) occurs in the cathode during a usual operation. An electromotive reaction of formula (3) occurs in the whole fuel cell FC.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

The oxidizing gas supply system ASS has an oxidizing gas flow path AS3 and an oxidizing off-gas flow path AS4. The oxidizing gas flow path AS3 is a flow path through which the oxidizing gas to be supplied to the cathode of the fuel cell FC flows. The oxidizing off-gas flow path AS4 is a flow path through which an oxidizing off-gas discharged from the fuel cell FC flows.

The oxidizing gas flow path AS3 is provided with an air compressor AS2 and a humidifier AS5. The air compressor AS2 is a compressor which takes the oxidizing gas from the atmosphere through a filter AS1. The humidifier AS5 is a humidifier which humidifies the oxidizing gas pressurized by the air compressor AS2.

The oxidizing off-gas flow path AS4 is provided with a pressure sensor S6, a back-pressure regulator A3 and the humidifier AS5. The back-pressure regulator A3 is a valve for regulating the supply pressure of the oxidizing gas. The humidifier AS5 is provided to perform the exchange of water between the oxidizing gas (a dry gas) and an oxidizing off-gas (a wet gas).

The fuel gas supply system FSS has a fuel gas supply source FS1, a fuel gas flow path FS3, a circulation flow path FS4, a circulation pump FS5 and a gas/water discharge flow path FS6. The fuel gas flow path FS3 is a flow path through which the fuel gas to be supplied from the fuel gas supply source FS1 to the anode of the fuel cell FC flows. The circulation flow path FS4 is a flow path for returning, to the fuel gas flow path FS3, a fuel off-gas discharged from the fuel cell FC. The circulation pump FS5 is a pump which forwards under pressure the fuel off-gas in the circulation flow path FS4 to the fuel gas flow path FS3. The gas/water discharge flow path FS6 is a flow path branched and connected to the circulation flow path FS4.

The fuel gas supply source FS1 is constituted of, for example, a high pressure hydrogen tank, a hydrogen storing alloy or the like, and stores the hydrogen gas having a high pressure (e.g., from 35 MPa to 70 MPa). When a shutoff valve H1 is opened, the fuel gas flows out of the fuel gas supply source FS1 to the fuel gas flow path FS3. The pressure of the fuel gas is decreased to, for example, about 200 kPa by a regulator H2 or an injector FS2, and the gas is supplied to the fuel cell FC.

The fuel gas flow path FS3 is provided with the shutoff valve H1, the regulator H2, the injector FS2, a shutoff valve H3 and a pressure sensor S4. The shutoff valve H1 is a valve for shutting off or allowing the supply of the fuel gas from the fuel gas supply source FS1. The regulator H2 regulates the pressure of the fuel gas. The injector FS2 controls the supply amount of the fuel gas to the fuel cell FC. The shutoff valve H3 is a valve for shutting off the supply of the fuel gas to the fuel cell FC.

The regulator H2 is a device which regulates the upstream side pressure (the primary pressure) thereof into a preset secondary pressure. For example, the regulator H2 is constituted of a mechanical pressure reduction valve for reducing the primary pressure and the like. The mechanical pressure reduction valve has a housing in which a back pressure chamber and a pressure regulation chamber are formed with a diaphragm being interposed therebetween. The pressure reduction valve has a constitution in which the primary pressure in the pressure regulation chamber is decreased to a predetermined pressure by the back pressure in the back pressure chamber to obtain the secondary pressure. The regulator H2 can be disposed on the upstream side of the injector FS2 to effectively decrease the upstream side pressure of the injector FS2.

The injector FS2 is an electromagnetic driving type on-off valve in which a valve body can directly be driven by an electromagnetic driving force for a predetermined driving period, and detached from a valve seat to regulate a gas flow rate or a gas pressure. The injector FS2 comprises a valve seat having a jet hole through which a gas fuel such as the fuel gas is jetted, a nozzle body which supplies and guides the gas fuel to the jet hole, and the valve body included and held so as to be movable in an axial line direction (a gas flow direction) with respect to this nozzle body to open and close the jet hole.

The valve body of the injector FS2 is driven by a solenoid which is an electromagnetic driving device, and has a constitution in which the gas jet time and gas jet timing of the injector FS2 can be controlled by a control signal output from the controller EC. To supply the gas at a flow rate required on the downstream side of the injector FS2, the injector FS2 varies at least one of the open area (the open degree) and open time of the valve body provided in the gas flow path of the injector, thereby regulating the flow rate (or the hydrogen molar concentration) of the gas to be supplied on the downstream side.

The circulation flow path FS4 is provided with a shutoff valve H4, and connected to the gas/water discharge flow path FS6. The gas/water discharge flow path FS6 is provided with a gas/water discharge valve H5. The gas/water discharge valve H5 is a valve which operates in accordance with a command from the controller EC to discharge, to the outside, the fuel off-gas including impurities in the circulation flow path FS4, and water. The gas/water discharge valve H5 is opened to lower the concentration of the impurities included in the fuel off-gas in the circulation flow path FS4, whereby the concentration of hydrogen in the fuel off-gas circulated through a circulation system can be increased.

The fuel off-gas discharged through the gas/water discharge valve H5 is mixed with the oxidizing off-gas flowing through the oxidizing off-gas flow path AS4, and diluted by a diluter (not shown). The circulation pump FS5 is driven by a motor to circulate and supply the fuel off-gas in a circulation system to the fuel cell FC.

The power system ES comprises a DC/DC converter ES1, a battery ES2, a traction inverter ES3, a traction motor ES4, auxiliary machines ES5 and an FC boost converter ES6. The fuel cell system FCS has a constitution of a parallel hybrid system in which the DC/DC converter ES1 and the traction inverter ES3 are connected in parallel with the fuel cell FC. The DC/DC converter ES1 and the traction inverter ES3 constitute a power control unit (PCU).

The FC boost converter ES6 is a DC/DC converter having a function of raising the output voltage of the fuel cell FC to output the voltage to the traction inverter ES3 and the traction motor ES4. The DC/DC converter ES1 has a function of raising a direct-current voltage supplied from the battery ES2 to output the voltage to the traction inverter ES3. The DC/DC converter ES1 has a function of lowering a direct-current power generated by the fuel cell FC or a regenerative power collected by the traction motor ES4 by regenerative braking to charge the power into the battery ES2. By these functions of the DC/DC converter ES1, the charging/discharging of the battery ES2 is controlled. Moreover, voltage conversion by the DC/DC converter ES1 is controlled, thereby controlling the operation point (an output terminal voltage and an output current) of the fuel cell FC. A voltage sensor S1 and a current sensor S2 are attached to the fuel cell FC. The voltage sensor S1 is a sensor for detecting the voltage of an output terminal of the fuel cell FC raised by the FC boost converter ES6. The current sensor S2 is a sensor for detecting the output current of the fuel cell FC. Moreover, a temperature sensor S7 for detecting the temperature or a power line is interposed between the boost converter ES6 and the traction inverter ES3.

The battery ES2 functions as a storage source of a surplus power, a regenerative energy storage source during the regenerative braking, or an energy buffer during load fluctuation accompanying the acceleration or deceleration of the fuel cell vehicle. As the battery ES2, for example, a nickel/cadmium accumulator battery, a nickel/hydrogen accumulator battery, or a secondary battery such as a lithium secondary battery is suitable. An SOC sensor S3 for detecting a state of charge (SOC) is attached to the battery ES2.

The traction inverter ES3 is, for example, a PWM inverter driven by, for example, a pulse width modulation system. The traction inverter ES3 converts the direct-current voltage output from the fuel cell FC or the battery ES2 into a three-phase alternate-current voltage in accordance with a control command from the controller EC to control the rotation torque of the traction motor ES4. The traction motor ES4 is, for example, a three-phase alternate-current motor, and constitutes a power source of the fuel cell vehicle.

The auxiliary machines ES5 generically include motors arranged in units of the fuel cell system FCS (e.g., power sources for pumps, etc.), inverters for driving these motors, and various car-mounted auxiliary machines (e.g., the air compressor, the injector, a cooling water circulation pump, a radiator, etc.).

The cooling system CS has a radiator CS1, a cooling solution pump CS2, a cooling solution forward path CS3 and a cooling solution backward path CS4. The radiator CS1 radiates the heat of a cooling solution for cooling the fuel cell FC to cool the solution. The cooling solution pump CS2 is a pump for circulating the cooling solution between the fuel cell FC and the radiator CS1. The cooling solution forward path CS3 is a flow path connecting the radiator CS1 to the fuel cell FC, and is provided with the cooling solution pump CS2. When the cooling solution pump CS2 is driven, the cooling solution flows from the radiator CS1 to the fuel cell FC through the cooling solution forward path CS3. The cooling solution backward path CS4 is a flow path connecting the fuel cell FC to the radiator CS1, and is provided with a water temperature sensor S5. When the cooling solution pump CS2 is driven, the cooling solution which has cooled the fuel cell FC returns to the radiator CS1.

The controller EC (the control unit) is a computer system comprising a CPU, an ROM, an RAM and an input/output interface, and controls the units of the fuel cell system FCS. For example, the controller EC starts the operation of the fuel cell system FCS upon receiving a start signal IG output from an ignition switch. Afterward, the controller EC acquires the demand power of the whole fuel cell system FCS based on an accelerator pedal open degree signal ACC output from an accelerator pedal sensor, a vehicle speed signal VC output from a vehicle speed sensor, or the like. The demand power of the whole fuel cell system FCS is a total value of a vehicle running power and an auxiliary machine power.

Here, an auxiliary machine power includes a power consumed by car-mounted auxiliary machines (the humidifier, air compressor, hydrogen pump, cooling water circulation pump, etc.), a power consumed by devices necessary for the vehicle running (a transmission, wheel control device, steering device, suspension device, etc.), a power consumed by devices arranged in a passenger space (an air conditioner, light fixture, audio, etc.) and the like.

Moreover, the controller EC determines the distribution of the output power of the fuel cell FC and the battery ES2. The controller EC controls the oxidizing gas supply system ASS and the fuel gas supply system FSS so that the amount of the power to be generated by the fuel cell FC matches a target power. Moreover, the controller EC outputs a command signal to the DC/DC converter ES1, allows the DC/DC converter ES1 to execute converter control, and controls the operation point (the output terminal voltage and the output current) of the fuel cell FC. Furthermore, the controller EC outputs, for example, alternate-current voltage command values of U, V and W-phases as switching commands to the traction inverter ES3 so as to obtain a target torque in accordance with the accelerator pedal open degree, thereby controlling the output torque and rotational frequency of the traction motor ES4. In addition, the controller EC controls the cooling system CS so that the fuel cell FC has an appropriate temperature.

Figure 2:
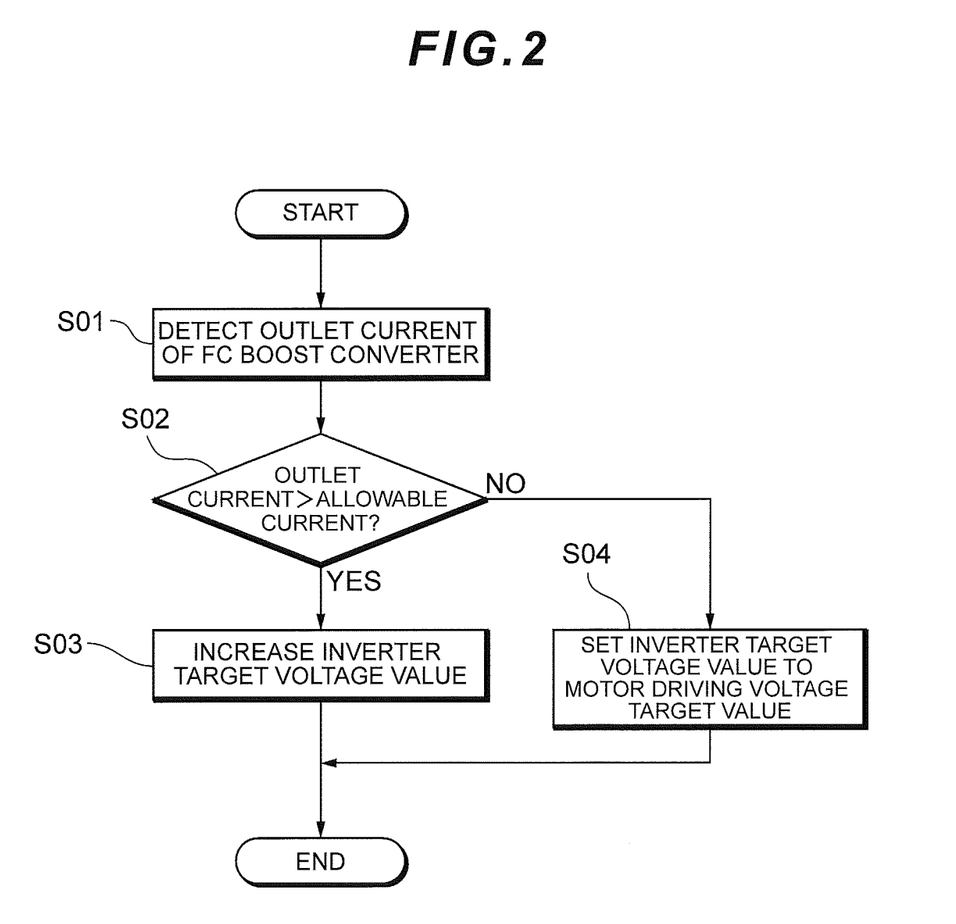
FIG. 2 is a flow chart concerning the target voltage control of the fuel cell system shown in FIG. 1.

Next, the target voltage control of the traction inverter ES3 will be described with reference to FIG. 2. In step S01, the outlet current of the FC boost converter ES6 is detected by the current sensor S2.

In step S02 subsequent to the step S01, it is judged whether or not the outlet current detected in the step S01 is above an allowable current. In the present embodiment, the FC boost converter ES6 is connected to the PCU via a power line (a power cable), whereby the allowable current is determined by this power line. When the outlet current is above the allowable current, processing advances to step S03. When the outlet current is not above the allowable current, the processing advances to step S04.

Figure 6:
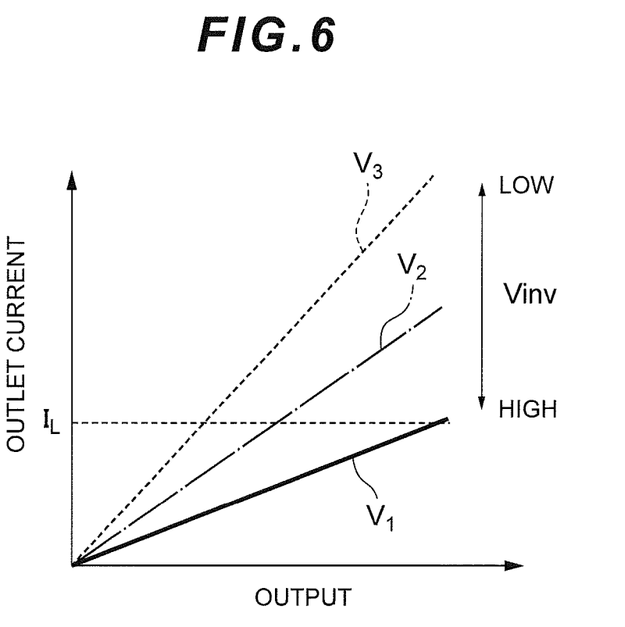
FIG. 6 is a diagram for explaining a target voltage in the target voltage control shown in FIG. 2.

In the step S03, the target voltage value of the traction inverter ES3 is increased. When the target voltage value of the traction inverter ES3 is increased, the current flowing through the power line between the FC boost converter ES6 and the PCU consequently lowers, and can be not more than the allowable current of the power line. FIG. 6 shows a relation between the output of the FC boost converter ES6 and the outlet current of the FC boost converter. In this case, when the target voltage value of the traction inverter ES3 is increased (e.g., V1 of FIG. 6), the outlet current with respect to the same output lowers. When the target voltage value of the traction inverter ES3 is decreased (e.g., V3 of FIG. 6), the outlet current with respect to the same output rises. In this way, the target voltage value of the traction inverter ES3 is determined in accordance with the allowable current of the power line between the FC boost converter ES6 and the PCU.

In the step S04, the target voltage value of the traction inverter ES3 is set to the driving voltage target value of the traction motor ES4, and usual control is executed.

In the target voltage control of the traction inverter ES3, the loss of the FC boost converter ES6 is taken into consideration according to a preferable configuration. The target voltage control of the traction inverter ES3 in consideration of the loss of the FC boost converter ES6 will be described with reference to FIG. 3.

Figure 3:
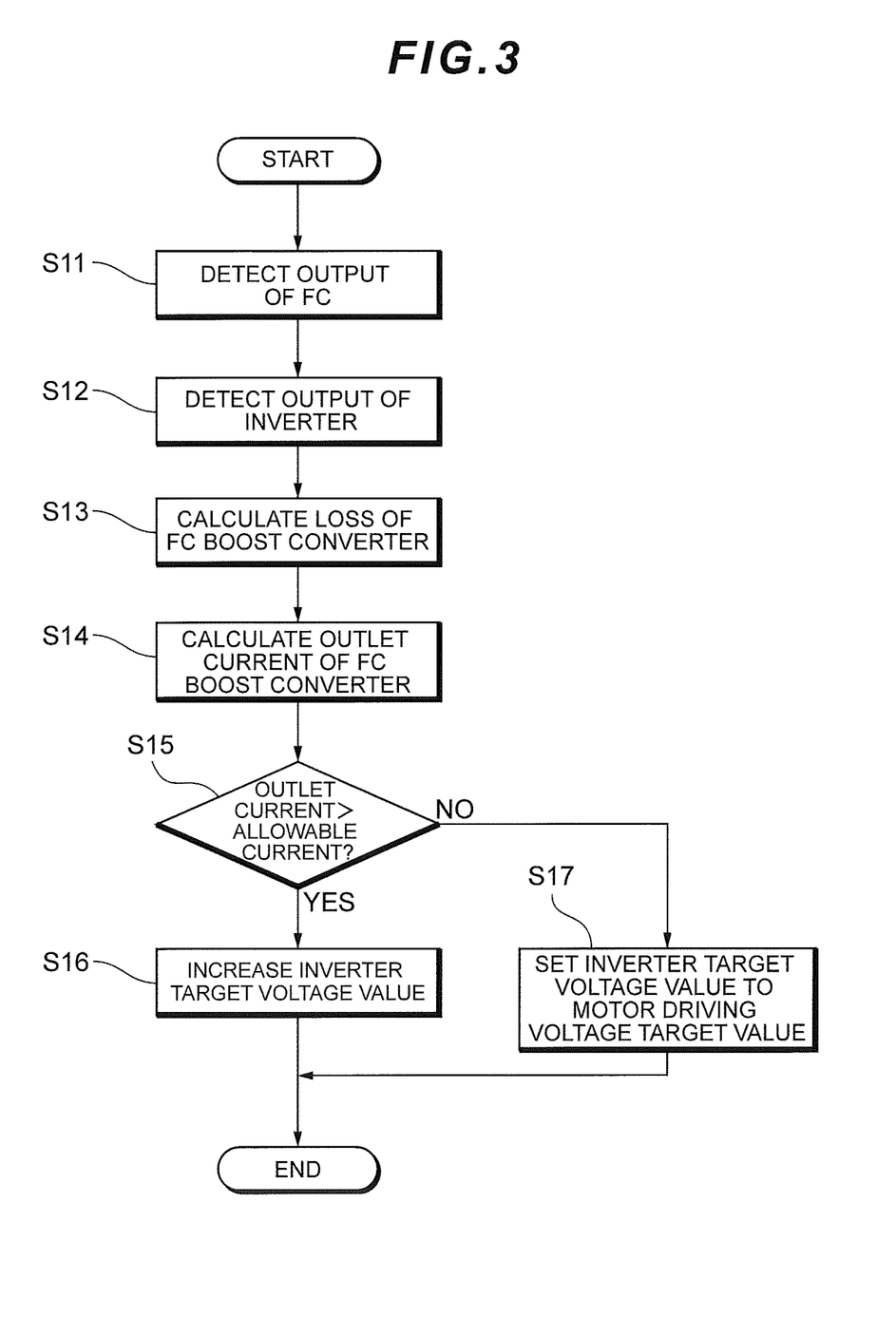
FIG. 3 is a flow chart concerning the target voltage control in consideration of the loss of an FC boost converter.

In step S11, the output of the fuel cell FC is detected. In step S12 subsequent to the step S11, the output of the traction inverter ES3 is detected. In step S13 subsequent to the step S12, the loss of the FC boost converter ES6 is calculated based on the output of the traction inverter ES3 and the output of the fuel cell FC.

In step S14 subsequent to the step S13, the output of the FC boost converter ES6 is calculated from the output of the fuel cell FC. Subsequently, the output of the FC boost converter ES6 is divided by the output voltage of the traction inverter ES3 to calculate the outlet current of the FC boost converter ES6.

In step S15 subsequent to the step S14, it is judged whether or not the outlet current calculated in the step S14 is above the allowable current. In the present embodiment, the FC boost converter ES6 is connected to the PCU via the power line (the power cable), whereby the allowable current is determined by this power line. When the outlet current is above the allowable current, the processing advances to step S16. When the outlet current is not above the allowable current, the processing advances to step S17.

In the step S17, the target voltage value of the traction inverter ES3 is increased. When the target voltage value of the traction inverter ES3 is increased, the current flowing through the power line between the FC boost converter ES6 and the PCU consequently lowers, and can be not more than the allowable current of the power line.

In the step S18, the target voltage value of the traction inverter ES3 is set to the driving voltage target value of the traction motor ES4, and the usual control is executed.

It is to be noted that in the target voltage control described with reference to FIG. 3, the control in consideration of the loss of the FC boost converter ES6 is executed to improve precision. However, even if the target voltage is controlled without taking the loss of the FC boost converter ES6 in consideration, the power line can be protected. Specifically, the output of the fuel cell FC is divided by the output voltage of the traction inverter ES3 to obtain the outlet current of the FC boost converter ES6, and the outlet current is preferably compared with the allowable current to selectively execute the processing of the steps S17 and S18. In any case, the control can be performed so as to vary the target voltage without using the current sensor, whereby the power line can be protected.

In the target voltage control of the traction inverter ES3, the driving of the traction motor ES4 is taken into consideration according to a preferable configuration. The target voltage control of the traction inverter ES3 in consideration of the driving of the traction motor ES4 will be described with reference to FIG. 4.

Figure 4:
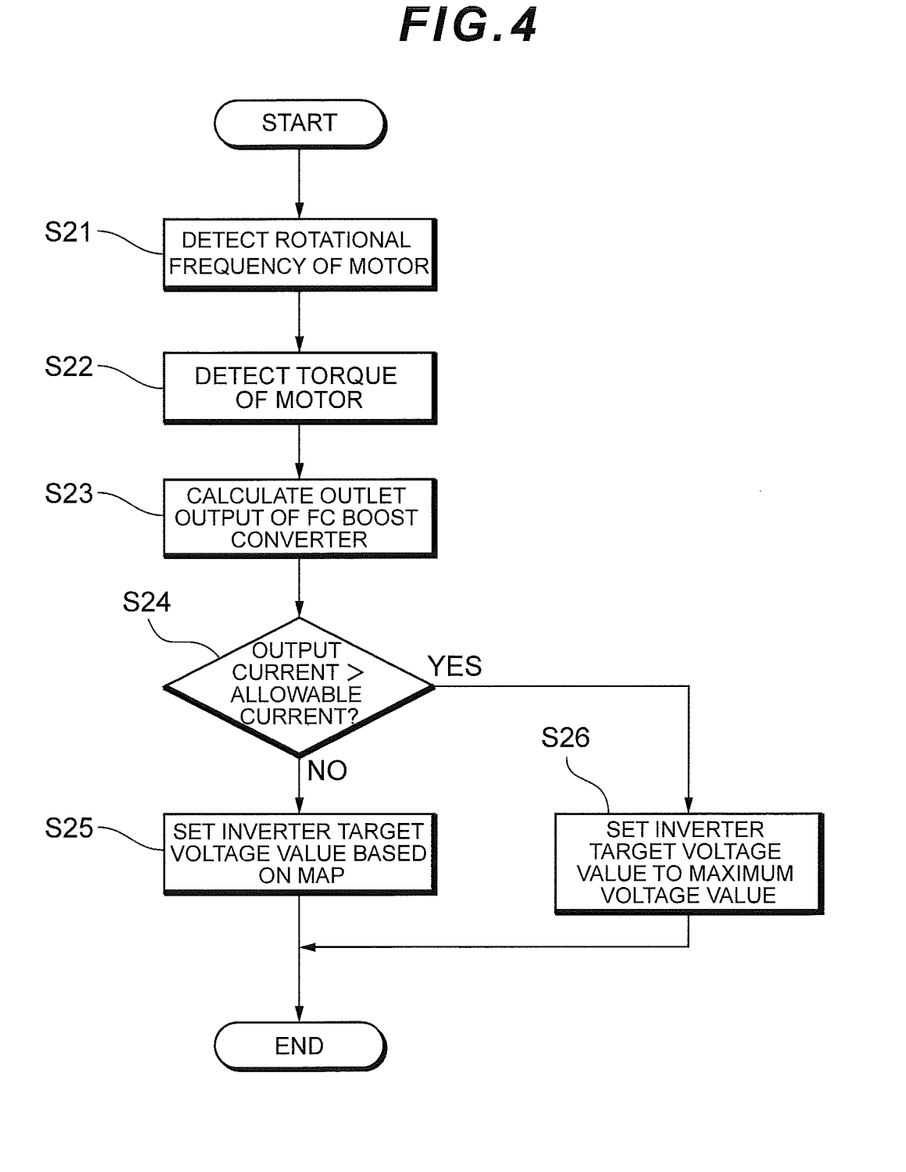
FIG. 4 is a flow chart concerning the target voltage control in consideration of the driving of a traction motor.

In step S21, the rotational frequency of the traction motor ES4 is detected. In step S22 subsequent to the step S21, the torque of the traction motor ES4 is detected. It is to be noted that the steps S21 and S22 may be executed in parallel.

In step S23, the outlet output of the FC boost converter ES6 is calculated based on the rotational frequency of the traction motor ES4 detected in the step S21 and the torque of the traction motor ES4 detected in the step S22.

In step S24 subsequent to the step S23, the outlet output of the FC boost converter ES6 is divided by the output voltage of the traction inverter ES3 to obtain the output current of the FC boost converter ES6, thereby judging whether or not the current is above the allowable current. In the present embodiment, since the FC boost converter ES6 is connected to the PCU via the power line (the power cable), the allowable current is determined by this power line. When the outlet current is above the allowable current, the processing advances to step S26. When the outlet current is not above the allowable current, the processing advances to step S25.

Figure 7:
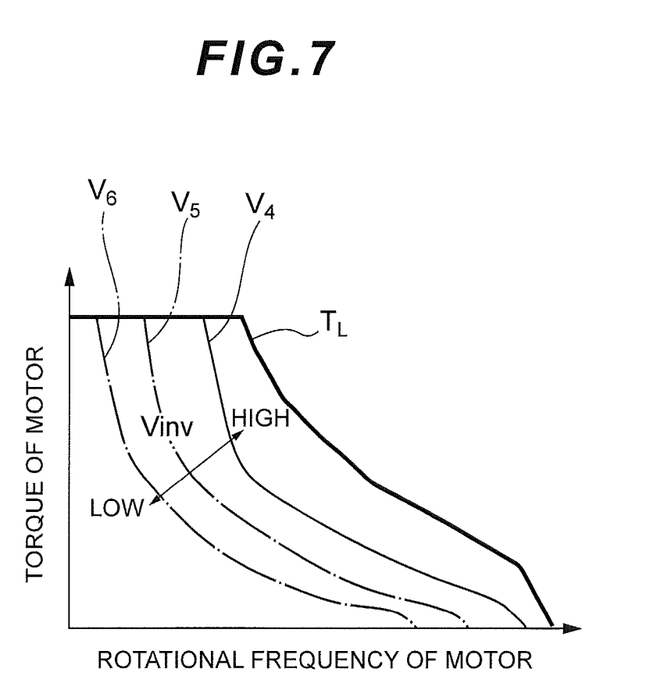
FIG. 7 is a diagram for explaining a target voltage in the target voltage control shown in FIG. 4.

In the step S25, the target voltage value of the traction inverter ES3 is set so that the output voltage of the traction inverter ES3 is larger than the driving voltage demanded by the traction motor ES4, the system loss is minimized, and the outlet current does not exceed the allowable current. Specifically, the value is set based on a map shown in FIG. 7, and in an example shown in FIG. 7, the target voltage value is set to V5 or V4.

In the step S26, the target voltage value of the traction inverter ES3 is set to a maximum voltage. The value is V4 in the map shown in FIG. 7.

In the target voltage control of the traction inverter ES3, the temperature of the power line extending from the FC boost converter ES6 to the PCU is taken into consideration according to a preferable configuration. The target voltage control of the traction inverter ES3 in consideration of the temperature of the power line extending from the FC boost converter ES6 to the PCU will be described with reference to FIG. 5.

Figure 5:
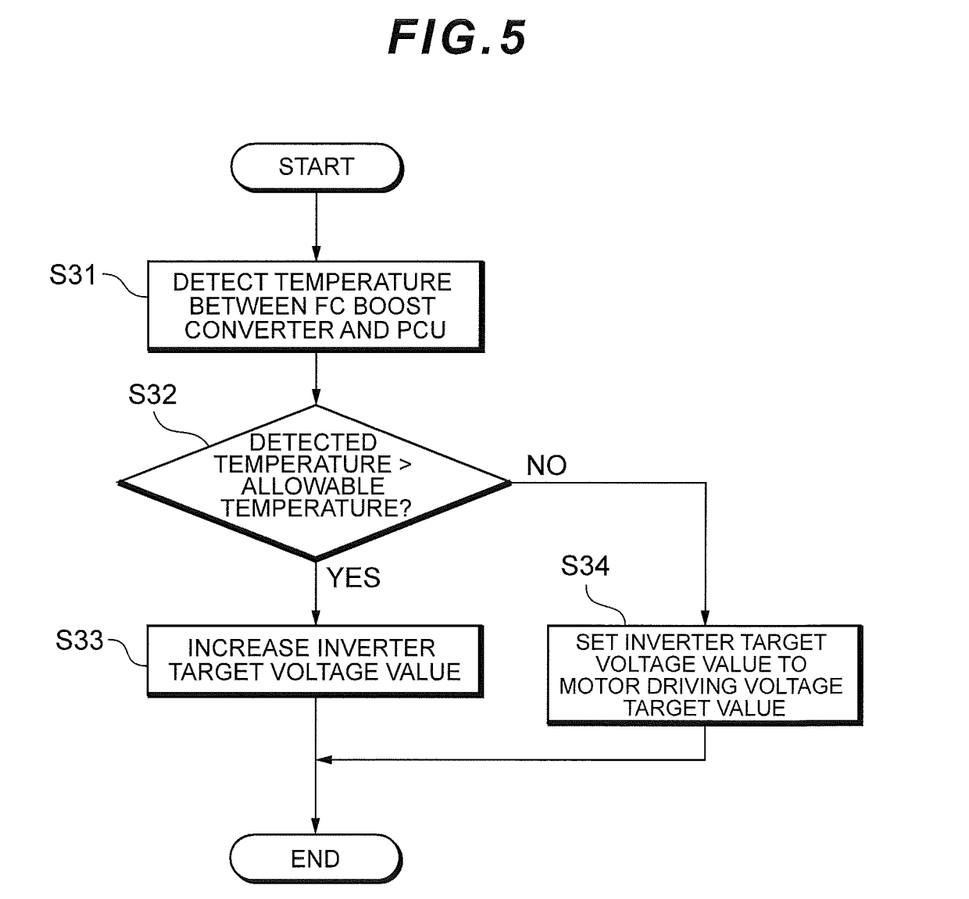
FIG. 5 is a flow chart concerning the target voltage control in consideration of a temperature.

In step S31, the temperature of the power line between the FC boost converter ES6 and the PCU is detected by the temperature sensor S7. In step S32 subsequent to the step S31, it is judged whether or not the temperature detected in the step S31 is above an allowable temperature. In the present embodiment, since the FC boost converter ES6 is connected to the PCU via the power line (the power cable), the allowable temperature is determined by this power line. When the detected temperature is above the allowable temperature, the processing advances to step S33. When the outlet current is not above the allowable current, the processing advances to step S34.

In the step S33, the target voltage value of the traction inverter ES3 is increased. When the target voltage value of the traction inverter ES3 is increased, the current flowing through the power line between the FC boost converter ES6 and the PCU consequently lowers, and can be not more than the allowable temperature of the power line.

In the step S34, the target voltage value of the traction inverter ES3 is set to the driving voltage target value of the traction motor ES4, and the usual control is executed.

DESCRIPTION OF REFERENCE NUMERALS

FCS: fuel cell system
FC: fuel cell
ASS: oxidizing gas supply system
AS1: filter
AS2: air compressor
AS3: oxidizing gas flow path
AS4: oxidizing off-gas flow path
AS5: humidifier
A3: back-pressure regulator
CS: cooling system
CS1: radiator
CS2: cooling solution pump
CS3: cooling solution forward path
CS4: cooling solution backward path
FSS: fuel gas supply system
FS1: fuel gas supply source
FS2: injector
FS3: fuel gas flow path
FS4: circulation flow path
FS5: circulation pump
FS6: gas/water discharge flow path
H1: shutoff valve
H2: regulator
H3: shutoff valve
H4: shutoff valve
H5: gas/water discharge valve
ES: power system
ES1: DC/DC converter
ES2: battery
ES3: traction inverter
ES4: traction motor
ES5: auxiliary machines
ES6: FC boost converter
EC: controller
S1: voltage sensor
S2: current sensor
S3: SOC sensor
S4, S6: pressure sensor
S5: water temperature sensor
ACC: accelerator pedal open degree signal
IG: start signal
VC: vehicle speed signal

The invention claimed is:

1. A fuel cell system comprising: a fuel cell; and a load connected to the fuel cell, the fuel cell system further comprising:
   a converter which is interposed between the fuel cell and the load and which raises the output voltage of the fuel cell to output the voltage to the load;
   an inverter which converts a direct-current power output from the converter into an alternate-current power to output the power to the load;
   a controller which controls the fuel cell, the converter and the inverter; and
   a current sensor which detects a current flowing between the converter and the inverter,
   wherein the controller controls the inverter so as to raise the target output voltage of the inverter, when the current detected by the current sensor exceeds a predetermined current threshold value.

2. A fuel cell system comprising: a fuel cell; and a load connected to the fuel cell, the fuel cell system further comprising:
   a converter which is interposed between the fuel cell and the load and which raises the output voltage of the fuel cell to output the voltage to the load;
   an inverter which converts a direct-current power output from the converter into an alternate-current power to output the power to the load;
   a controller which controls the fuel cell, the converter and the inverter; and
   a temperature sensor which detects the temperature of a power line between the converter and the inverter,
   wherein the controller controls the inverter so as to raise the target output voltage of the inverter, when the temperature detected by the temperature sensor exceeds a predetermined temperature threshold value.

* * * * *